United States Patent [19]

Bachle

[11] Patent Number: 4,494,693
[45] Date of Patent: Jan. 22, 1985

[54] FLUID ACTUATED THERMAL COMPENSATOR WITH ADJUSTABLE STROKE CHARACTERISTICS

[75] Inventor: Wilfred H. Bachle, Long Beach, Calif.

[73] Assignee: Ford Motor Company, Dearborn, Mich.

[21] Appl. No.: 404,956

[22] Filed: Aug. 4, 1982

[51] Int. Cl.³ ............................ F03C 5/00; F16J 3/06; G05D 23/12
[52] U.S. Cl. .................................... 236/100; 60/530; 92/37; 374/198; 374/203
[58] Field of Search ................................ 350/252–253, 350/255, 310, 429–430; 372/103; 337/315, 320–321, 323, 326; 92/1, 13, 13.2, 13.6, 37–39; 251/335 B; 137/468; 73/708; 374/196, 198, 200, 202–203; 60/517, 521, 525, 530; 236/51–52, 31, 65, 86, 100, DIG. 11

[56] References Cited

U.S. PATENT DOCUMENTS

| | | | |
|---|---|---|---|
| 731,959 | 6/1903 | Sheer | 60/530 |
| 2,316,611 | 4/1943 | Neuse | 374/202 |
| 2,797,700 | 7/1957 | McGowen, Jr. | 92/37 |
| 2,893,717 | 7/1959 | Simmons | 350/255 |
| 3,038,979 | 6/1962 | Yanikoski | 337/320 |
| 3,212,337 | 10/1965 | McCarrick | 236/100 |
| 3,319,467 | 5/1967 | Feinberg | 236/100 |
| 3,503,004 | 3/1970 | Haisma et al. | 331/94.5 |
| 3,612,664 | 10/1971 | Berman | 350/253 |
| 3,821,684 | 6/1974 | Keating | 337/323 |
| 4,190,325 | 2/1980 | Moreno | 350/253 |
| 4,236,790 | 12/1980 | Smith | 350/253 |
| 4,286,839 | 9/1981 | Ilzig et al. | 350/96.26 |

FOREIGN PATENT DOCUMENTS 987988  8/1951  France ............................ 350/253

OTHER PUBLICATIONS

Oversluizen, T. "Small, Low Internal Volume Valve and a Low Temperature Bellows–Sealed Needle Valve", Rev. Sci. Instruments, 6–1975, pp. 788–789.

Primary Examiner—William H. Punter
Attorney, Agent, or Firm—Paul K. Godwin, Jr.; Robert D. Sanborn

[57] ABSTRACT

An adjustable liquid thermal compensator mechanism which provides both an actuation end attached to an expandible volume portion of a liquid chamber and a manually controlled adjustable volume portion that is used to calibrate the stroke of the compensator by allowing the addition or release of fluid from the chamber. A supply reservoir is interconnected to the compensation chamber through a valve which provides the increased or decreased amount of fluid during chamber adjustment.

4 Claims, 5 Drawing Figures

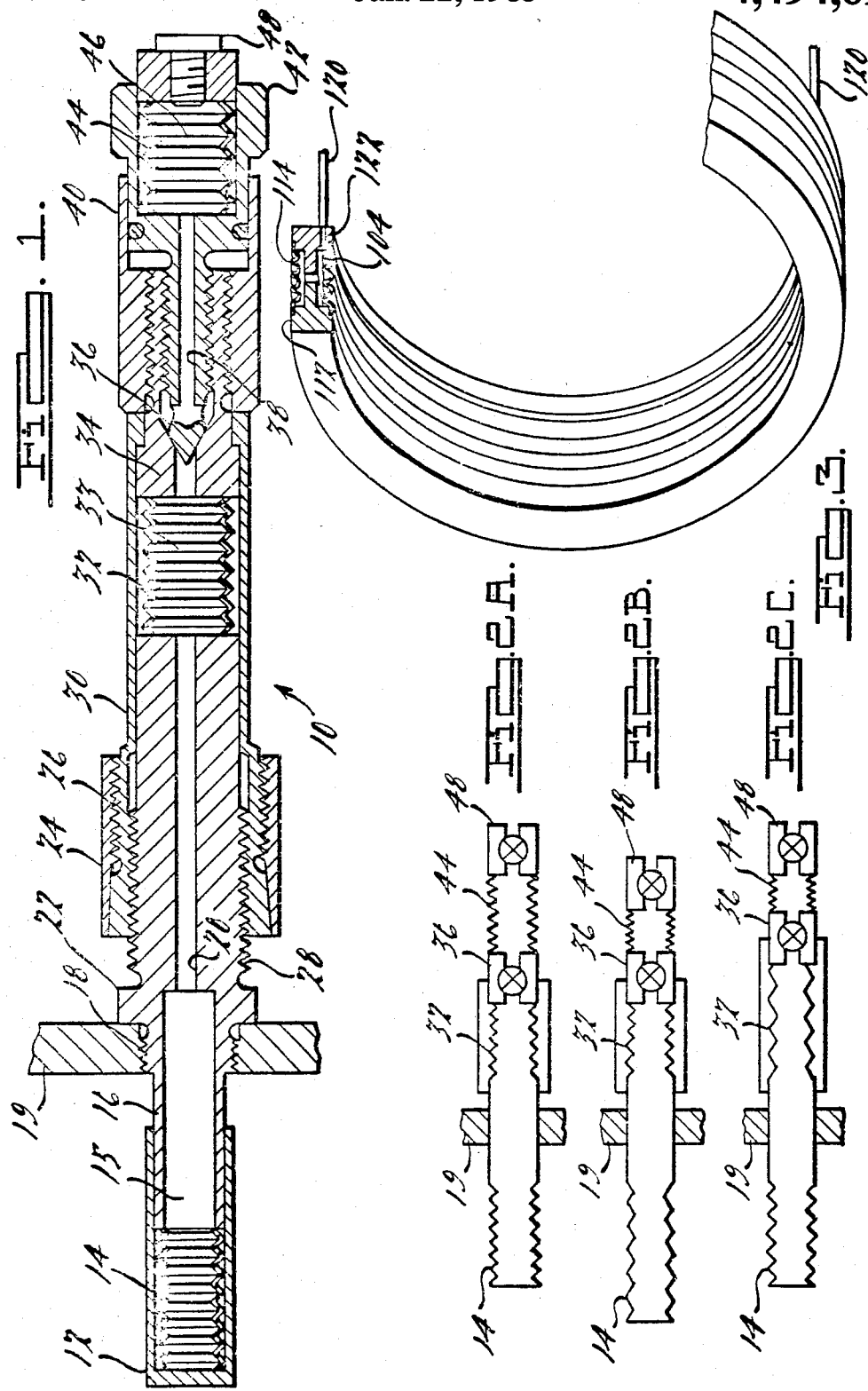

FLUID ACTUATED THERMAL COMPENSATOR WITH ADJUSTABLE STROKE CHARACTERISTICS

BACKGROUND OF THE INVENTION

1. Field of the Invention

The present invention is directed to the field of thermal compensators that provide linear movement in response to changes in thermal temperatures and more specifically to the area of thermal compensators that utilize a liquid as the thermal responsive medium.

2. Description of the Prior Art

The problem of focus distortion in optical systems due to changes in temperature has been frequently discussed in the prior art. Generally, ambient temperature variations cause glass lenses to expand or to contract and vary the indices thereof. The lens mounts also tend to expand or contract due to changes in temperature and therefore additionally distort the focal characteristics of the optical system. In order to maintain a fixed focal point throughout wide variations in temperature, many passive systems have been developed for compensating the above-mentioned expansion and contraction. The prior art with respect to passive compensator systems falls into two major groups, which include bi-metal mechanisms, such as shown in U.S. Pat. No. 4,190,325 and U.S. Pat. No. 4,236,790; and liquid expansion structures, such as disclosed in U.S. Pat. Nos. 3,503,004 and 3,612,664.

In general, applicant has found the liquid thermal compensators to be favored over the bi-metal types due to the difficulty in repeatedly obtaining metals that have precise values of thermal coefficient; and since the relatively small coefficients of expansion require a relatively long length of metal to achieve significant compensation. Even though the prior art liquid compensator devices overcome the problems found in bi-metal type devices, the prior art fails to suggest how either type of passive mechanism may be accurately tuned to provide a desired amount of compensation over a range of temperatures after they are constructed.

SUMMARY OF THE INVENTION

The present invention is intended to overcome the deficiencies in the prior art by providing a thermal compensator of a unique design that may be adjusted to provide the desired amount of stroke (linear compensation) for a specific change in temperature.

The compensator of the present invention comprises a means defining a relatively fixed housing member having an aperture extending therethrough; means defining an actuation element slideably mounted on one end of the housing means for linear movement with respect thereto; means defining a support tube mounted to extend from the opposite end of the housing means for linear movement with respect thereto; means defining a fluid tight chamber that extends from the actuation element means through the aperture to a volume within the support tube means; and a liquid phase fluid occupying the chamber means, wherein the fluid and chamber means change volumetrically in response to changes in temperature.

In a first embodiment of the invention, the actuation element is a piston which surrounds a single bellows. As the ambient temperature changes, the volume within the chamber changes, thereby causing the actuation bellows to responsively expand or contract and cause the actuation piston to linearly move with respect to the housing.

In a second embodiment of the invention, the actuation element forms a circular lens mount that is supported for linear movement with respect to a circular housing by a plurality of bellows circumferentially disposed between the actuation element and the housing.

In each of the embodiments, the actuation element is in fluid communication with a volume within a support tube. That volume is occupied by a trim bellows which is adjustable via the support tube to set the reference location of the actuation element.

A supply reservoir is also interconnected with the chamber through a valve and is utilized to supply or drain fluid from the chamber during a calibration adjustment procedure.

It is, therefore, an object of the present invention to provide an improved thermal compensator utilizing a liquid medium that volumetrically responds to changes in ambient temperature.

It is a further object of the present invention to provide an improved thermal compensator with novel adjustment means to calibrate the stroke characteristics that are desired for each individually constructed compensator.

It is a further object of the present invention to provide a thermal compensator that has the aforementioned advantages in various physical embodiments.

BRIEF DESCRIPTION OF THE DRAWINGS

FIG. 1 is a cross-sectional view of a first embodiment of the present invention.

FIGS. 2A, 2B and 2C illustrate the volume adjustment technique employed in calibrating the stroke characteristic of the thermal compensator shown in FIG. 1.

FIG. 3 illustrates a second embodiment of the actuation portion of the present invention.

DESCRIPTION OF THE PREFERRED EMBODIMENT

A first embodiment of the thermal compensator 10 of the present invention as shown in FIG. 1. A main cylindrical body 22 contains a mounting thread 18 which is utilized to fix the body 22 to a relatively fixed support 19. The body 22 contains a first end 16 extending from the threaded portion 18 to support a slideable actuation piston 12 that is mounted for axial movement with respect thereto. A central aperture 20 is defined through the body 22 to provide liquid communication from one end to the other. An actuation bellows 14 is mounted between the first end 16 and the actuation piston 12, to control movement of the piston 12.

A trim reservoir bellows 32 is mounted at the opposite end of the housing 22 and is in liquid communication with the central passage 20. The opposite end of the trim reservoir bellows 32 is connected to a valved end-plug 34 and defines an adjustable volume 33. A trim reservoir support and adjustment tube 30 surrounds the housing 22 and the adjustable volume 33, as well as the end-plug 34. The tube 30 is thread mounted to the housing 22 on threads 28 and is held in place by a locking ring 24 threaded on a locking taper 26 on the tube 30.

The volume 33, defined within the tube 30, is variable and acts as a trim reservoir to adjust the setting of the actuation element 12 at a reference point. This embodiment utilizes the bellows 32 to contain the volume of liquid within the device. One end of the bellows 32 is connected to the end of the housing 22 within the support tube 30 and has its opposite end connected to a valved end plug 34. As the support tube 30 is rotated on threads 28 on the housing 22, it effects a linear movement of the valved end-plug 34 that causes the volume 33 to responsively change by expanding or contracting the trim reservoir bellows 32. The valved end plug 34 is normally sealed so that the entire liquid compensator chamber, defined by the volume 33, the passage 20 and the actuation volume 15, is a sealed unit.

A normally closed needle valve 36 is mounted within the valved end-plug 34, and may be opened in order to allow fluid to be entered into or drained out of the liquid compensator chamber. A supply reservoir bellows 44 is connected within the body of the needle valve 36 to define a supply reservoir 46 that is connected to the seated portion of the valve 36 through a passage 38. A slideable plug element 48 is mounted at the end of the needle valve body 36 and is connected to the opposite end of the supply reservoir bellows 44 to provide the necessary pressure to allow movement of the fluid between the liquid compensator chamber and the supply reservoir when the valve 36 is opened with respect to the seat in the end-plug 34. A locking ring 40 is threadedly mounted on an extension of the end-plug 34 to provide additional locking of the support tube 30 once it is properly adjusted.

In constructing the compensator, one must be aware that such a liquid thermal compensator uses the cubical expansion characteristics of the working fluid to drive the actuation element. The stroke obtained is a result of the proportioning of the actuation element area relative to the volume of liquid within the sealed chamber. Due to this fact, the construction of liquid thermal compensators may be of any convenient shape so long as the proper relationships are maintained. In the present invention, the stroke characteristics may be changed by increasing or decreasing the volume of liquid within the thermal compensation chamber. The sequence of adjustment steps to change the stroke characteristics of the thermal compensator is shown in FIGS. 2A, 2B and 2C.

Initially, after the compensator chamber has been filled with a known volume of liquid and it has been purged of all air, the valve 36 is closed to provide a sealed liquid compensator chamber. Cycling through a range of temperatures will cause the end of the actuation bellows 14 to move the actuation element a linear distance, $\delta$ which is the stroke chartacteristic. The stroke characteristic is analytically derived from relationship of $$\delta/\Delta T = V_o \beta / A$$

wherein $\Delta T$ is the temperature change in °C.; $\beta$ is the cubical expansion coefficient of the working liquid expressed in units of $(in^3)/(in^{3\circ}C.)$; Vo is the working liquid volume at a reference temperature To; and A is the effective area of the actuator being worked upon by the working liquid. If the stroke characteristic is different than that which is desired, the thermal compensator of the present invention may be adjusted as shown in FIG. 2B to the desired characteristic by adding or subtracting a volume of liquid to the compensator chamber via the supply reservoir bellows 44. In the example shown in FIG. 2B, it is determined that the stroke characteristic of the compensator shown in FIG. 2A has an insufficient stroke characteristic. Accordingly, a volume of liquid is added to the compensator from reservoir bellows 44 through valve 36 until such time as the actuation bellows 14 causes the actuation element to move a distance which is equivalent to the difference in stroke characteristics between the device shown in FIG. 2A and that which has the desired stroke characteristics. Subsequently, the valve 36 is closed to seal the liquid compensator chamber; and the trim reservoir support and adjustment tube 30 is adjusted to extend the trim reservoir bellows 32 and cause the actuation bellows 14 to contract and restore the actuation element to its initial reference position. The lock rings 24 and 40 are then tightened to fix the trim reservoir's support and adjustment tube 30 in place and allow the newly adjusted thermal compensator to function with its recalibrated stroke characteristic.

Several liquids have been found suitable for a thermal compensator of the present design and include: 99.3% Ethyl Alcohol ($\beta$=0.00112); Mineral Oil ($\beta$=0.000740); Glycerin ($\beta$=0.000505) and Ethylene Glycol ($\beta$=0.000638).

A second embodiment of the present invention is shown in FIG. 3 in which a circular lens mount 112 serves as the actuation element connected to a plurality of concentric bellows 104 and 114 which define an annular volume for containing the thermally responsive liquid and are connected to a circular housing 122. Conduits 120 are provided as liquid communication means between a trim reservoir bellows such as the type shown in FIG. 1, or a functionally-equivalent structure.

It should be noted that although the valve and supply reservoir bellows of the embodiment shown in FIG. 1 are conveniently incorporated as part of the structure shown therein, it is perceived that those elements could be remote from the actual compensator structure and connected by a non-expandible conduit.

It is apparent that many modifications and variations may be implemented without departing from the scope of the novel concept of this invention. Therefore, it is intended by the appended claims to cover all such modifications and variations which fall within the true spirit and scope of the invention.

I claim:

1. A thermal responsive actuator comprising:

means defining a relatively fixed elongated housing member having an adjustable actuation volume at one end and a central passage extending therefrom to an opposite end;

means defining a actuation element mounted on one end of said housing means in direct communication with said actuation volume for linear movement with respect to said housing;

means defining a hollow support tube threadedly positioned onto said housing means, defining an adjustable volume trim reservoir with a volume directly related to the threaded position of said support tube on said housing means and said trim reservoir being in direct communication with the opposite end of said central passage said actuation volume, said central passage and said trim reservoir together defining a fluid tight chamber;

a liquid phase fluid occupying said chamber wherein said fluid in said chamber changes volumetrically in response to changes in temperature;

a controllable valve means on said support tube in communication with said trim reservoir for sealing said chamber when closed or for allowing the supply of liquid to or the bleeding of liquid from said chamber when open;

means defining a liquid supply reservoir threaded onto said support tube in direct communication with said valve means and including a moveable element in communication with said liquid supply reservoir for forceably supplying liquid to or bleeding liquid from said chamber through said valve means.

2. An actuator as in claim 1, wherein said chamber means includes an actuation bellows within said actuation volume having one open end in direct communication with said fluid in said chamber means and a second closed end connected to said actuation element means for causing movement of said actuation element means in response to volumetric changes in said fluid.

3. An actuator as in claim 2, wherein said chamber means also includes means defining a trim reservoir bellows within said reservoir of said support tube means having one open end in direct communication with said chamber means and a second end connected to move in an axial direction along with said support tube means as said support tube means is threadably positioned on said housing means.

4. An actuator as in claim 3, wherein said reservoir trim bellows means is connected between said opposite end of said housing and said controllable valve means on said support tube means.

* * * * *

UNITED STATES PATENT AND TRADEMARK OFFICE
CERTIFICATE OF CORRECTION

PATENT NO. : 4,494,693

DATED : January 22, 1985

INVENTOR(S) : Wilfred H. Bachle

It is certified that error appears in the above-identified patent and that said Letters Patent are hereby corrected as shown below:

On the title page, Item [73]
Assignee designation cancel "Ford Motor Company"

and substitute --Ford Aerospace and Communications Corporation--

Signed and Sealed this

Twenty-eighth Day of May 1985

[SEAL]

Attest:

DONALD J. QUIGG

*Attesting Officer*     *Acting Commissioner of Patents and Trademarks*